US006633446B1

(12) United States Patent
Sako (10) Patent No.: US 6,633,446 B1
(45) Date of Patent: Oct. 14, 2003

(54) MAGNETIC REPRODUCING APPARATUS AND REPRODUCING CIRCUIT TO BE APPLIED TO THE APPARATUS

(75) Inventor: Michiya Sako, Kagoshima (JP)

(73) Assignee: Sony Corporation (JP)

( * ) Notice: Subject to any disclaimer, the term of this patent is extended or adjusted under 35 U.S.C. 154(b) by 374 days.

(21) Appl. No.: 09/711,265

(22) Filed: Nov. 9, 2000

(30) Foreign Application Priority Data

Nov. 12, 1999 (JP) .......................................... P11-323050
Feb. 2, 2000 (JP) ...................................... P2000-025082

(51) Int. Cl.[7] .................. G11B 5/02; G11B 15/12; G11B 5/03; G11B 5/09
(52) U.S. Cl. ........................ 360/67; 360/63; 360/46; 360/66
(58) Field of Search .......................... 360/46, 66, 67, 360/63

(56) References Cited

U.S. PATENT DOCUMENTS

| 5,331,478 A | * 7/1994 | Aranovsky | 360/67 |
| 5,834,952 A | * 11/1998 | Ngo | 327/54 |
| 5,886,568 A | * 3/1999 | Ngo et al. | 327/538 |
| 6,054,901 A | * 4/2000 | Nainar et al. | 330/292 |

* cited by examiner

Primary Examiner—Regina N. Holder
(74) Attorney, Agent, or Firm—Rader, Fishman & Grauer PLLC; Ronald P. Kananen (57) ABSTRACT

A reproducing circuit for a MR head is proposed, wherein a MR head is interposed between a pair of current source circuits and a feedback amplifier is provided for controlling the current of the pair of the current source circuits so that a terminal voltage of the MR head becomes a predetermined value. Reproduced output from the MR head is derived from an amplifier having balanced input terminals for canceling noises and ripple components included in a power source.

38 Claims, 7 Drawing Sheets

MAGNETIC REPRODUCING APPARATUS AND REPRODUCING CIRCUIT TO BE APPLIED TO THE APPARATUS

BACKGROUND OF THE INVENTION

1. Field of the Invention

This invention relates to a magnetic reproducing apparatus and a reproducing amplifier circuit to be applied to this apparatus. In particular this invention relates to a reproducing amplifier circuit for a MR head that is adopted to a Voltage-Bias Voltage-Sense type reproducing system.

2. Description of the Related Art

In a recording and/or reproducing apparatus such as a HDD (Hard Disk Drive) apparatus, preferably a MR (Magneto-Resistive) head is used in order to reproduce data recorded on a magnetic recording hard disc. In this MR head, the resistance of the MR head changes according to the-change of a magnetic field generated based on recorded data on the magnetic recording hard disc.

As one of reproducing system for such MR head, a Voltage-Bias Voltage-Sense type reproducing system is introduced, wherein the change of the resistance of the MR head corresponding to the recorded data is derived as an output voltage by applying a predetermined bias voltage to the MR head.

Figure 1:
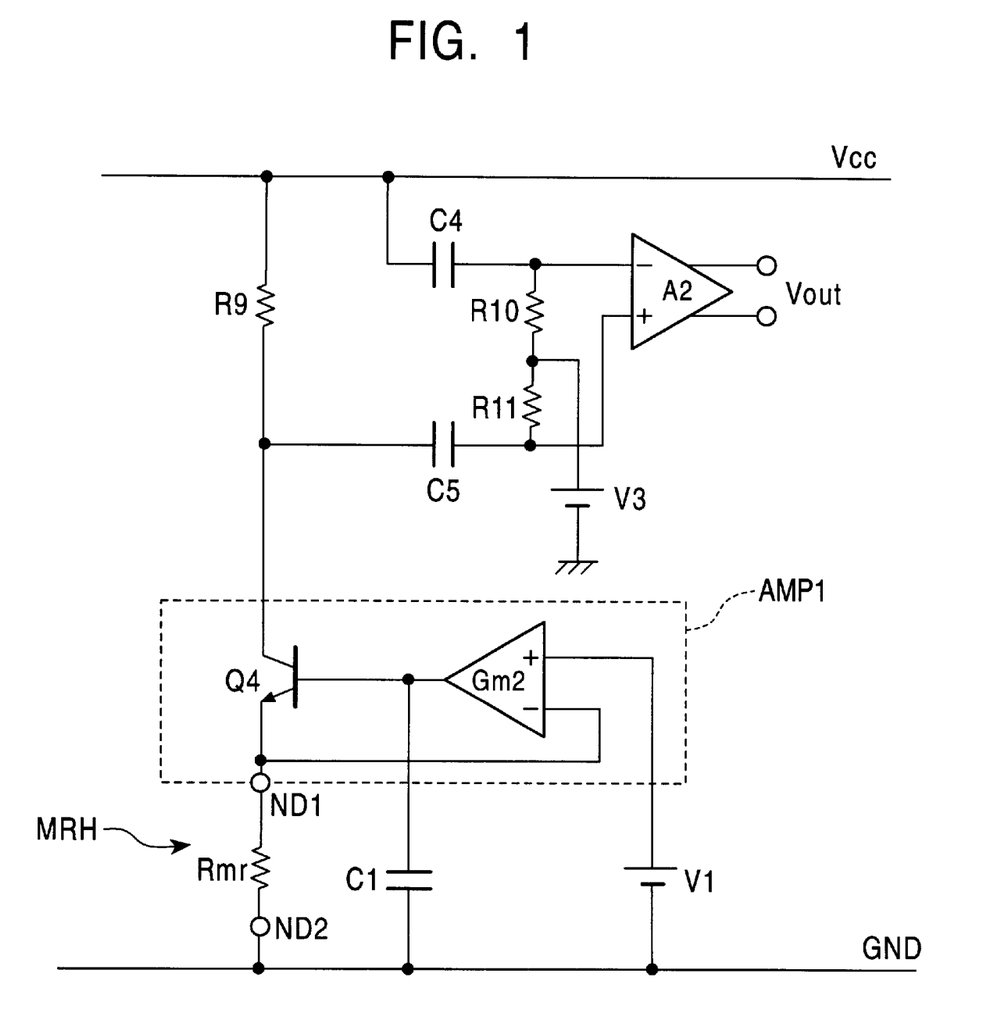
FIG. 1 shows a circuit diagram of a conventional reproducing amplifier circuit for a MR head of the invention.

FIG. 1 shows a conventional circuit diagram for a MR head, wherein a feedback loop is formed in a voltage-current converting circuit Gm2 in order to supply a reference voltage V1 to a MR head MRH. Namely, a constant voltage supply amplifier circuit AMP1 is connected to one node voltage terminal ND1 of the MR head MRH and the other node voltage terminal ND2 is connected to ground GND. The constant voltage supply amplifier circuit AMP1 includes the above mentioned voltage-current converting circuit Gm2. One input terminal (+) of the voltage-current converting circuit Gm2 is connected to the reference voltage V1, and the other input terminal (−) thereof is connected to the output side for feedback operation, namely to an output connected to the node voltage terminal ND1 of the MR head MRH. A transistor Q4 is connected to an output of the voltage-current converting circuit Gm2, beside a capacitor C1, in order to take out a detecting signal from the MR head MRH. Thereby, the voltage of the node voltage terminal ND1 of the MR head MRH is fixed to the reference voltage V1, and the change of the resistance of the MR head MRH is taken out as a collector current of the transistor Q4. The current flowing through the MR head MRH is called a bias current IB and is expressed with the next expression:

$$IB=V1/Rmr$$

In the above expression, the Rmr shows a resistance of the MR head MRH. The collector current of the transistor Q4 corresponding to the change of the resistance of the MR head MRH flows through a resistor R9, and the DC (Direct Current) component included in the signal components generated across the resistor R9 is cut by a capacitor C5, and thereby the recorded data is reproduced by amplifying alternate current components in the signal components by a differential amplifier A2. In FIG. 1, a reference bias voltage V3 is supplied to a mid-point of series-connected resisters R10 and R11 connected between two input terminals of the differential amplifier A2 for deciding an operating bias point of the differential amplifier A2. Further a capacitor C4 is connected between a power source Vcc and one of the input terminals of the differential amplifier A2.

However, in the conventional reproducing amplifier circuit of the voltage bias system, one of terminals of the MR head MRH is connected to ground GND, and thereby when static electricity is supplied to the MR head MRH due to external noises or other reason, a rush current corresponding to the static electricity divided by the resistance Rmr of the MR head MRH resultantly flows. Normally, the resistance Rmr of the MR head shows around 30Ω to 80Ω, and when a large amount of rush current flows due to the static electricity, the problem of the MR head being destroyed by the rush current will possibly occur.

In addition, the signal taken out as the collector current of the transistor Q4 is converted to the signal voltage by the resistor R9, and this signal voltage is supplied to the non-inverting input terminal of the differential amplifier A2. On the other hand, the inverting input terminal of the differential amplifier A2 is merely biased by the reference bias voltage V3. Namely, there is formed a circuit for converting signal components obtained as a single-type output through the resistor R9 and the capacitor C5 into a differential type output.

In such a construction, the input section of the differential amplifier A2 is not completely symmetric and, accordingly, ripple components of the power source Vcc are supplied as differential components through the pair of input terminals to the differential amplifier A2. On this account, the ripple components in the power source Vcc are not completely removed, and this causes deterioration of high frequency characteristics in the reproducing circuit for the MR head installed in the HDD apparatus, for example.

SUMMARY OF THE INVENTION

The primary objective of the present invention are to prevent the destruction of the MR head by a large amount of rush current when static electricity is applied thereto and to present a reproducing amplifier for a MR head capable of supplying an output signal without affecting the high frequency property in spite of ripple components included in the power source.

According to the present invention, in order to achieve the above objectives, a novel reproducing amplifier for a MR head is proposed, wherein a MR head is interposed between a pair of current source circuits and a feedback amplifier is provided for controlling the current of the pair of current source circuits so that the terminal voltage of the MR head becomes a predetermined value.

According to this construction for a reproducing amplifier circuit of the MR head, the MR head is connected between the two current sources, so that when static electricity is applied to the MR head, the voltage difference due to the applied static electricity does not appear at the terminals of the MR head, and thereby the MR head is protected from destruction by a large amount of current due to the applied static electricity.

In addition, when ripple components are included in the power source by connecting a differential amplifier to the MR head in order to derive the output signal, the terminal current of the MR head due to the ripple components is changed in-phase, so that the ripple components do not appear in the output signal and thereby the high frequency characteristic of the output signal is not deteriorated by the ripple components.

In a preferred construction of one example of the present invention, the above-mentioned feedback amplifier has a predetermined cut-off frequency, and it keeps the terminal voltage of the MR head at a value which remains constant to a signal having a frequency band below the cut-off frequency. On the contrary, the feedback amplifier changes the terminal voltage of the MR head to a signal having a frequency band above the predetermined cut-off frequency through a change of resistance of the MR head by applying a constant current through the pair of current source circuits.

According to this preferred construction, if the cutoff frequency of the feedback amplifier is set to a lower frequency than the frequency band where resistance change due to noises, the feedback amplifier keeps the terminal voltage of the MR head constant to the change of the resistance in the frequency lower than the cut-off frequency, and thereby the reproducing operation is not done.

On the contrary, the feedback amplifier does not operate to keep the terminal voltage of the MR head constant to the change of the resistance in the frequency higher than the cut-off frequency, so that output signal is generated as the terminal voltage of the MR head due to the recorded data, and thereby the reproducing operation is done. The change of the terminal voltage of the MR head is derived as the reproduced output signal.

In a more preferred construction of this invention, a two series-connected resisters having a resistance larger than that of the MR head is connected between two terminals of the MR head and the junction point of the two resistors is connected to ground.

According to the above construction, even when error components are produced in a DC current from the two current sources due to manufacturing dispersion, a mid-point voltage of the MR head is determined by the product of the error amount of the two current source circuits and the resistance of the two resistors connected in parallel, and thereby the mid-point voltage is always kept at the ground potential.

BRIEF DESCRIPTION OF THE DRAWINGS

In the accompanying drawings:

FIGS. 5(a) to 5(d) show a set of time charts for explaining the operation of the reproducing amplifier circuit employing a pair of MR heads depicted in FIG. 4;

FIGS. 7(a) to 7(f) show a set of time charts for explaining the operation of the reproducing amplifier circuit employing a pair of MR heads depicted in FIG. 6.

DESCRIPTION OF THE PREFERRED EMBODIMENTS

Figure 2:
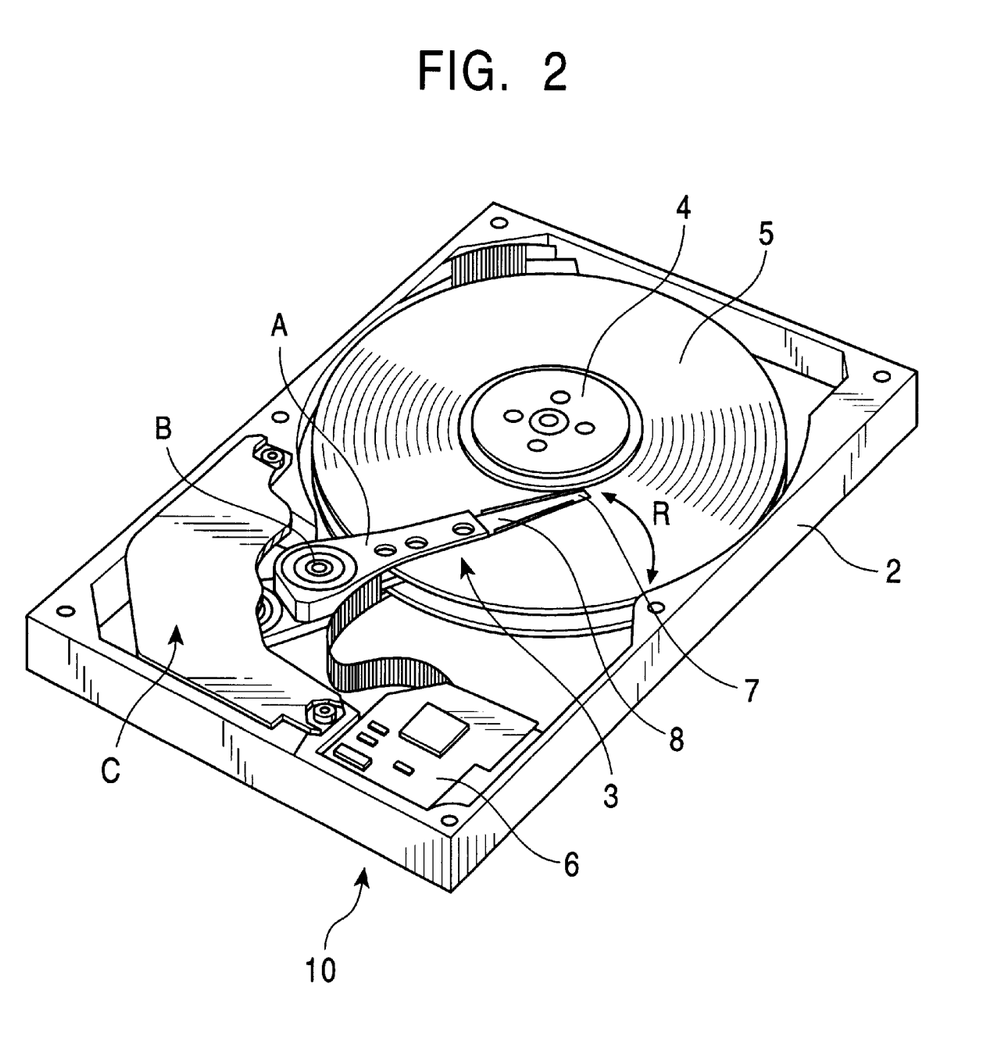
FIG. 2 shows a perspective view of a hard disc drive apparatus to which this invention is applied.

One embodiment of the present invention is explained with reference to the attached drawings, as follows. Namely, FIG. 2 is one example of a HDD (Hard Disc Drive) apparatus to which this invention is applied. A HDD apparatus 1 comprises a chassis 2, a rotary type actuator 3 mounted on the chassis 2, a spindle motor 4, a magnetic recording disc 5 secured to the spindle motor 4 and a flexible wiring substrate 6 mounted on the chassis 2. Electronic circuits and wiring patterns are formed on the flexible wiring substrate 6 by a semiconductor fabrication process or a printing process.

The chassis 2 has a flat rectangular form with material such as aluminum metal; and, the spindle motor 4 is fixed on a flat portion of the chassis 2. The rotary type actuator 3 comprises a floating head slider 7 to which a MR (Magneto-Resistive) head MRH is mounted, a suspension 8 as a resilient support member for supporting the floating head slider 7, an arm A for supporting the suspension 8 and a voice-coil motor C for rotating the arm A around a perpendicular axis B. The reproducing amplifier of this invention is to be provided close to the MR head MRH.

Figure 3:
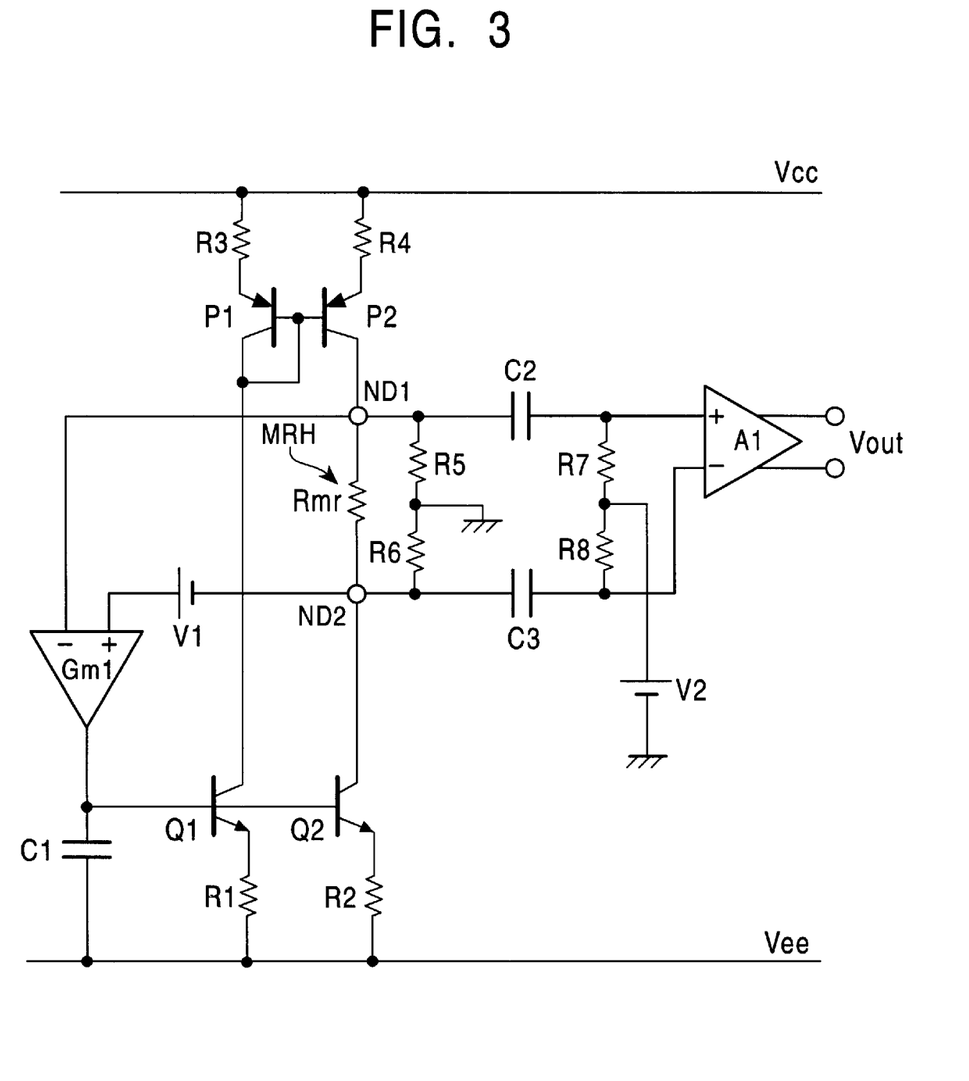
FIG. 3 shows a circuit diagram of one embodiment of a reproducing amplifier circuit for a MR head according to the present invention.

FIG. 3 shows one embodiment of a circuit diagram of the reproducing amplifier of this invention, wherein transistors P2 and Q2, provided as current sources, are connected to both node voltage terminals ND1 and ND2 of the MR head MRH, and a voltage-current converting circuit Gm1 as a feedback amplifier is provided for fixing a terminal voltage of the MR head MRH. In addition, besides transistors P1 and Q1, resistors R1 to R4 are connected to those transistors as shown in FIG. 3. The node voltage terminal ND 1 of the MR head MRH is connected to an inverting input of the voltage-current converting circuit Gm1, and the node voltage terminal ND 2 of the MR head MRH is connected to a non-inverting input of the voltage-current converting circuit Gm1 by way of a reference voltage V1.

Here, it is set that R1=R2, R3 =R4, an emitter area of the transistors Q1 and Q2 is designed to be the same, and an emitter area of the transistors P1 and P2 is designed to be the same. Thereby the transistors P1 and P2 form a current source of 1:1 and a collector current of the transistor P1 becomes equal to a collector current of the transistor P2. Accordingly, the collector currents of both the transistors P2 and Q2 become the same value.

In response to a predetermined cut-off frequency of the voltage-current converting circuit Gm1 (serves as the feedback amplifier), the voltage-current converting circuit Gm1 shows a feedback operation so that a terminal voltage between the node terminal ND1 and the node terminal ND2 becomes the reference voltage V1.

In this case, a cut-off frequency fcl2 of the voltage-current converting circuit Gm1 is expressed as follows.

$$fcl2 = (1/2\pi) \times (gm1/C1) \times (Rmr/R2)$$

Wherein, gm1 is the transfer conductance of the voltage-current converting circuit Gm1, and Rmr is the resistance of the MR head MRH.

As the voltage-current converting circuit Gm1 works in a frequency band lower than this cut-off frequency fcl2, so that collector current of the transistors P2 and Q2 changes in response to the change of the resistance of the MR head MRH, and thereby the terminal voltage between the node terminal ND1 and the node terminal ND2 of the MR head MRH remains the reference voltage V1, there occurs no voltage change.

The feedback loop, including the voltage-current converting circuit Gm1 for maintaining the terminal voltage between the node terminal ND1 and the node terminal ND2 of the MR head MRH of the reference voltage V1, does not work in a frequency band higher than this cut-off frequency fcl2. Accordingly, the terminal voltage between the node terminal ND1 and the node terminal ND2 of the MR head MRH changes in accordance with the change of the resistance of the MR head MRH. In this case, as described before, the collector current of the transistors P2 and Q2 does not change, and a constant bias current IB flows through the transistors P2 and Q2 as the collector current.

The change of the resistance of the MR head MRH is derived at the both node terminals ND1 and ND2 as a voltage signal expressed by a product of the bias current IB and the change of the resistance of the MR head MRH. This voltage signal is supplied by way of DC cut capacitors C2 and C3 to an differential amplifier A1 to derive a reproducing signal.

In order to keep the mid-point voltage of the MR head MRH at about ground level in spite of errors in DC current components of the transistors P2 and Q2 due to dispersion upon the fabrication process, resistors R5 and R6 are interposed in series between the node terminals ND1 and ND2. On this account, the resistance of each resistor R5, R6 is set to be equal and adequately larger than the resistance of the MR head MRH, and further the node terminals ND1 and ND2 are grounded by way of these resisitors R5, and R6. In this case, a product of error components of DC current flowing through the transistors P2 and Q2 and the resistance of the parallel-connected resistors R5 and R6 becomes the mid-point voltage of the MR head MRH.

In addition, a reference voltage V2 is provided to determine a bias voltage for the differential amplifier A1 by way of resistors R7 and R8.

The power source voltages for Vcc and Vee are set to be +3V and −3V, for example. In FIG. 3, the reference voltage V1 is connected to the non-inverting input of the voltage-current converting circuit Gm1, but may be connected to the inverting input of the voltage-current converting circuit Gm1. In this case, a minus terminal of the reference voltage V1 has to be connected to the non-inverting input of the voltage-current converting circuit Gm1, and a plus terminal has to be connected to the node terminal ND1 of the MR head MRH.

As mentioned in the above explanation, the MR head MRH is interposed between two current sources different from the conventional circuit wherein one of node terminals of the MR head MRH is connected to ground. Accordingly when static electricity is applied, the voltages between the two node terminals ND1 and ND2 are not different and the MR head MRH is not destroyed by the large rush current due to the static electricity.

In addition, generally a power source installed in a personal computer or an electronic appliance includes ripple noise components such as high frequency clock components; but, even if such ripple noise components are included in the power source, according to the present invention these ripple noise components are cancelled by the differential amplifier A1 as in-phase components because these ripple noise components are supplied to the differential amplifier A1 as in-phase differential input signals. Accordingly these ripple noise components do not effect bad influences on the high frequency property of the HDD apparatus that requires high frequency signal recording capability.

Furthermore, another example of this invention is explained with reference to FIG. 4. In this example, this invention is applied to a 2 channel head type hard disc drive apparatus. A circuit diagram of this 2-channel, head-type, hard-disc drive apparatus of this embodiment is disclosed with a pair of MR heads 15 and 16. A current source circuit 11 is connected between a power source Vcc and terminals W and Y of these MR heads 15 and 16 to supply bias current; and, further a current source circuit 12 is connected between a power source Vee and terminals X and Z of these MR heads 15 and 16 to flow the bias current.

The terminal W of the MR head 15 is connected to a terminal a1 of a switch SW1, and further connected to one input terminal of an amplifier A2 by way of a capacitor C2. On the other hand, the terminal X of the MR head 15 is connected to a terminal a2 of a switch SW2, and further connected to another input terminal of the amplifier A2 by way of a capacitor C3. Further, one of the terminals of a resistor R5 is connected to the input terminal of the amplifier A2; and, one of terminals of a resistor R6 is connected to the other input terminal of the amplifier A2. The other terminals of the resistors R5 and R6 are commonly connected to ground by way of a reference bias voltage V2. An output terminal of the amplifier A2 is connected to a terminal a4 of a switch SW4. In this case, the capacitor C2 and the resistor R5 and the capacitor C3 and the resister R6 constitute a high pass filter, respectively.

As described above, the terminal Y of the MR head 16 is connected to a terminal b1 of the switch SW1 and further connected to one input terminal of an amplifier A3 by way of a capacitor C4. On the other hand, the terminal Z of the MR head 16 is connected to a terminal b2 of the switch SW2 and further connected to another input terminal of the amplifier A3 by way of a capacitor C5. Further, one of terminals of a resistor R7 is connected to the input terminal of the amplifier A3 and one of terminals of a resister R8 is connected to the other input terminal of the amplifier A3. The other terminals of the resisters R7 and R8 are commonly connected to ground by way of a reference bias voltage V3. An output terminal of the amplifier A3 is connected to the terminal b4 of the switch SW4. In this case a common terminal of the switch SW4 is connected to the output terminal Vo of this 2-channel, head-type, hard-disc drive apparatus. The capacitor C4 and the resistor R7 and the capacitor C5 and the resistor R8 constitute a high pass filter, respectively.

On the other hand a positive electrode of the reference voltage supply 9 is connected to a common terminal of the switch SW1, a negative electrode of the reference voltage supply 9 is connected to an inverting input terminal of an operational amplifier GM1, and a non-inverting input terminal of the operational amplifier GM1 is connected to a common terminal of the switch SW2. Furthermore, an output terminal of the operational amplifier GM1 is not only connected to a common terminal of a switch SW3 but also connected to a lower power source Vee through a capacitor C1.

In addition, in the current source circuit 11, respective emitter electrodes of PNP transistors P1 and P2 are connected to the higher power source Vcc through a resistor R2, wherein respective base electrode and collector electrode of the transistors P1 and P2 are directly connected to each other. Further, respective emitter electrode of PNP transistors P3 and P4 are also connected to the power source Vcc through a resistor R4, and base electrodes of the PNP transistor P1 and P4 are connected to each other. In addition, respective base electrodes of the PNP transistors P2 and P3 are also connected to each other, and a collector electrode of the PNP transistor P3 is connected to the terminal W of the MR head 15. In addition, a collector electrode of the PNP transistor P4 is connected to the terminal Y of the MR head 16.

Further, in the current source circuit 12, base electrodes of the NPN transistors Q1 and Q2 are respectively connected to terminals b3 and a3 of the switch SW3, and emitter electrodes of the NPN transistors Q1 and Q2 are connected to the lower power source Vee through a resistor R1. In addition, a collector electrode of the NPN transistor Q1 is connected to the collector electrode of the PNP transistor P1 and a collector electrode of the NPN transistor Q2 is connected to the collector electrode of the PNP transistor P1, respectively.

In addition, respective base electrodes of the NPN transistors Q3 and Q4 are connected to terminals a3 and b3 of the switch SW3, and respective emitter electrodes of the NPN transistors Q3 and Q4 are connected to the lower power source Vee through a resistor R3. In addition, a collector electrode of the PNP transistor Q3 is connected to the terminal X of the MR head 15 and a collector electrode of the NPN transistor Q4 is connected to the terminal Z of the MR head 16, respectively.

In addition, in the 2-channel, head-type, hard-disc drive apparatus, characteristics of these transistors are selected so that the current ratio of the NPN transistor Q1 and the NPN transistor Q4 is the same as the current ratio of the PNP transistor P1 and the PNP transistor P4 and the current ratio of the NPN transistor Q2 and the NPN transistor Q3 is the same as the current ratio of the PNP transistor P2 and PNP transistor P3. Further, resistance of the respective resistors is selected so that the resistance ratio of resistors R1 and R3 becomes an inverse value of the current ratio of the NPN transistor Q1 and the NPN transistor Q4.

The 2-channel, head-type, hard-disc drive apparatus includes a control circuit 10A to which a head switching signal HΦ(0), HΦ(1) is supplied, and the switches SW1, SW2, SW3 and SW4 are respectively connected to output terminals of the this control circuit 10A, so that these switches SW1 to SW4 are synchronously switched.

When a head switching signal HΦ(0) for selecting the MR head 15 is supplied to the control circuit 10A, synchronously the switch SW1 is changed to the terminal a1, the switch SW2 is changed to the terminal a2, the switch SW3 is changed to the terminal a3 and the switch SW4 is changed to the terminal a4.Thereby, the reference voltage V1 of the reference voltage supply 9 is applied between the terminals W and X of the MR head 15, and if the resistance of the MR head 15 is defined as RM(R0) and the bias current flowing through the MR head 15 is defined as I(B0), then the I(B0) is expressed by I(B0)=V1/RM(R0).

In this case, if the cut-off frequency of the feedback loop including the operational amplifier GM1 and the current source circuit 12 is defined as fc11, this cut-off frequency fc11 is expressed as follows.

$$fc11=(1/2\pi)\times(gm1/C1)\times[RM(R0)/R3]$$

Wherein, gm1 is the transfer conductance of the operational amplifier GM1.

Thereby, the signal frequency to change the resistance of the MR head 15 is below the cut-off frequency fc11, the resistance RM (Ro) of the MR head 15 changes and the voltage across the terminals W and X tends to change. In this case when the resistance RM(R0) of the MR head 15 is increased, the potential of the output terminal of the operational amplifier GM1 goes to lower level because the potential of the terminal X is lowered. Accordingly, the base voltage of the NPN transistors Q2 and Q3 is lowered, thereby the current flowing through these NPN transistors Q2 and Q3 and the PNP transistors P2 and P3 is reduced. Namely, the collector current of the PNP transistor P3 is reduced, and thereby the voltage across the terminals W and X of the MR head 15 is controlled to be V1, in accordance with decrease of the bias current I(B0).

On the contrary, when the resistance RM(R0) of the MR head 15 is decreased, the potential of the output terminal of the operational amplifier GM1 goes to a higher level because the potential of the terminal X is raised. Accordingly, the base voltage of the NPN transistors Q2 and Q3 is raised, and thereby the current flowing through these NPN transistors Q2 and Q3 and the PNP transistors P2 and P3 is increased. Namely, the collector current of the PNP transistor P3 is increased, and thereby the voltage across the terminals W and X of the MR head 15 is controlled to be V1, in accordance with increase of the bias current I(B0).

As above described, the signal frequency to change the resistance of the MR head 15 is below the cut-off frequency fc11, the voltage across the terminals W and X of the MR head 15 is kept to the voltage V1, and the change of the resistance of the MR head 15 is not transferred to the amplifier A2, and thereby an output signal V0 from the amplifier A2 does not change.

On the contrary, the signal frequency to change the resistance of the MR head 15 is above the cut-off frequency fc11, the feed-back operation of the operational amplifier GM1 becomes ineffective, so that the resistance RM(R0) of the MR head 15 changes in accordance with the magnetic field of the recorded data recorded on the magnetic recording disc, and the output signal V0 is obtained as a reproduced signal as follows.

$$V0=I(B0)\times RM(R0)$$

Incidentally, the resistance of the MR head generally shows dispersion between about 30Ω and 80Ω, as is thought the case where the RM(R1)>RM(Ro), where the RM(R1) is the resistance of the MR head 16. When, in this case, the MR head 15 is switched to the MR head 16, a head switching signal HΦ(1) for selecting the MR head 16 is supplied to the control circuit 10A at a time t0 as shown in FIG. 5(a), the switch SW1 is changed to the terminal b1, the switch SW2 is changed to the terminal b2, the switch SW3 is changed to the terminal b3 and the switch SW4 is changed to the terminal b4, simultaneously as shown in FIG. 5(b).

Figure 5:
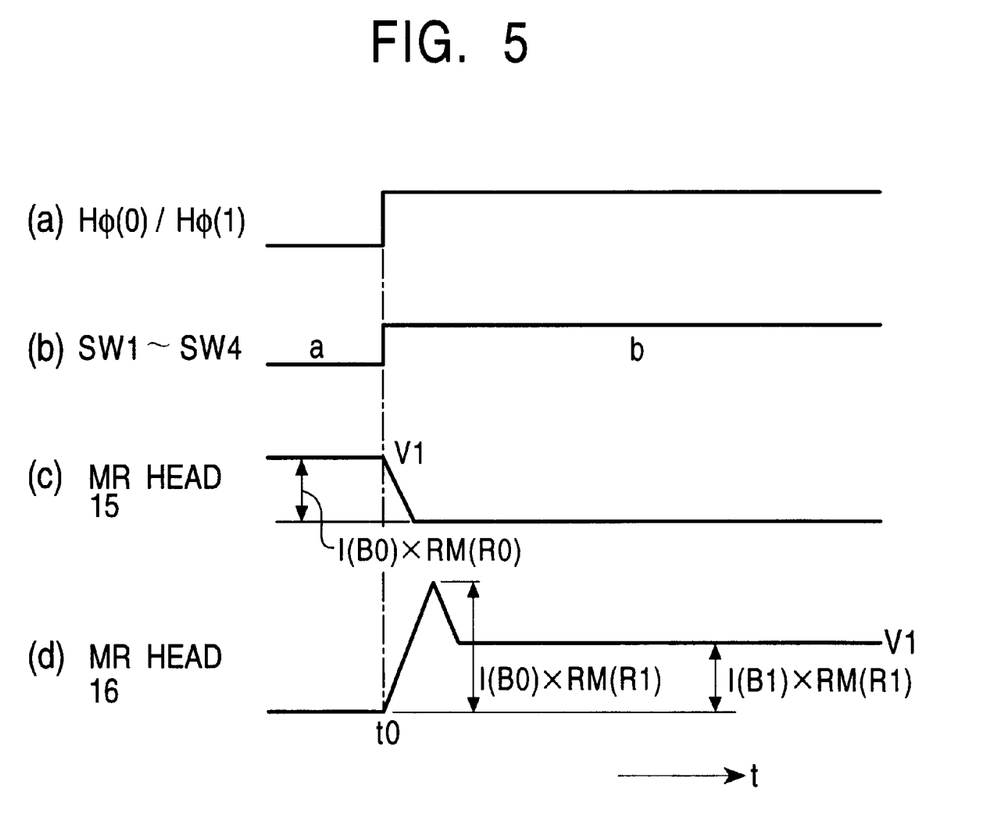

Thereby, the voltage V1=I(B0)×RM(R0) applied to the terminals W and X of the MR head 15 is abruptly shunt, so that the terminal voltage of the MR head 15 is going down as shown in FIG. 5(c). In this case, the output voltage of the operational amplifier GM1 is kept at a voltage expressed by R3×I(B0)+Vbe, where Vbe is a base-emitter voltage of the NPN transistor Q3, and thereby the current I(B0) flows in the MR head 16 at the switch timing.

On this account, an excess voltage I(B0)×RM(R1) is applied to the MR head 16, as shown in FIG. 5(d), so that this excess voltage deteriorates the quality of the MR head 16 and destroys the MR head 16, in the worst case.

Figure 6:
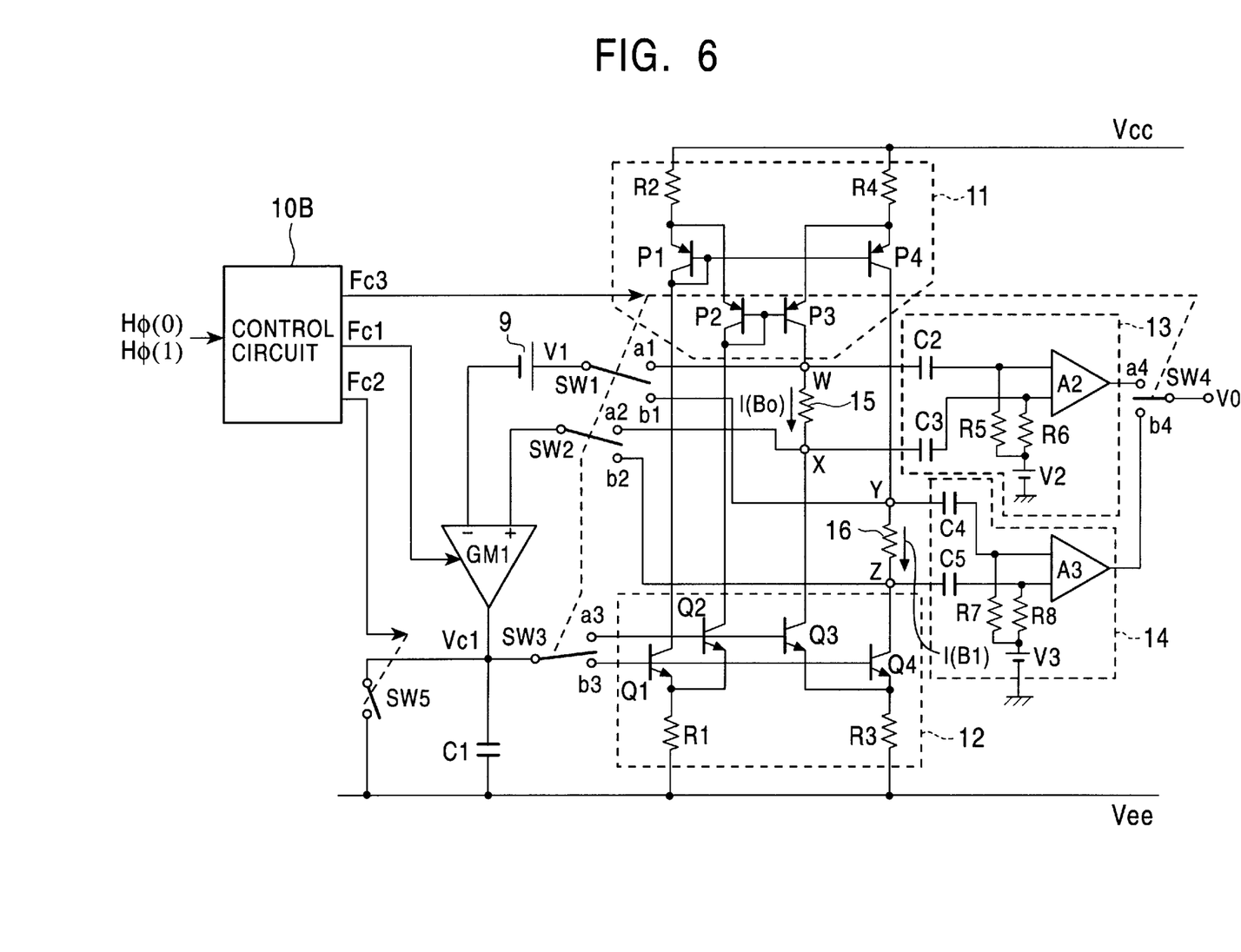
FIG. 6 shows another embodiment of a circuit diagram of a reproducing amplifier circuit employing a pair of MR heads according to the present invention.

In order to overcome the above described problem, another embodiment is explained with reference to FIG. 6 and FIGS. 7(a) to 7(f). FIG. 6 shows a circuit diagram for this embodiment, and FIGS. 7(a) to 7(f) are time charts for explaining the operation of the circuit in FIG. 6.

Figure 4:
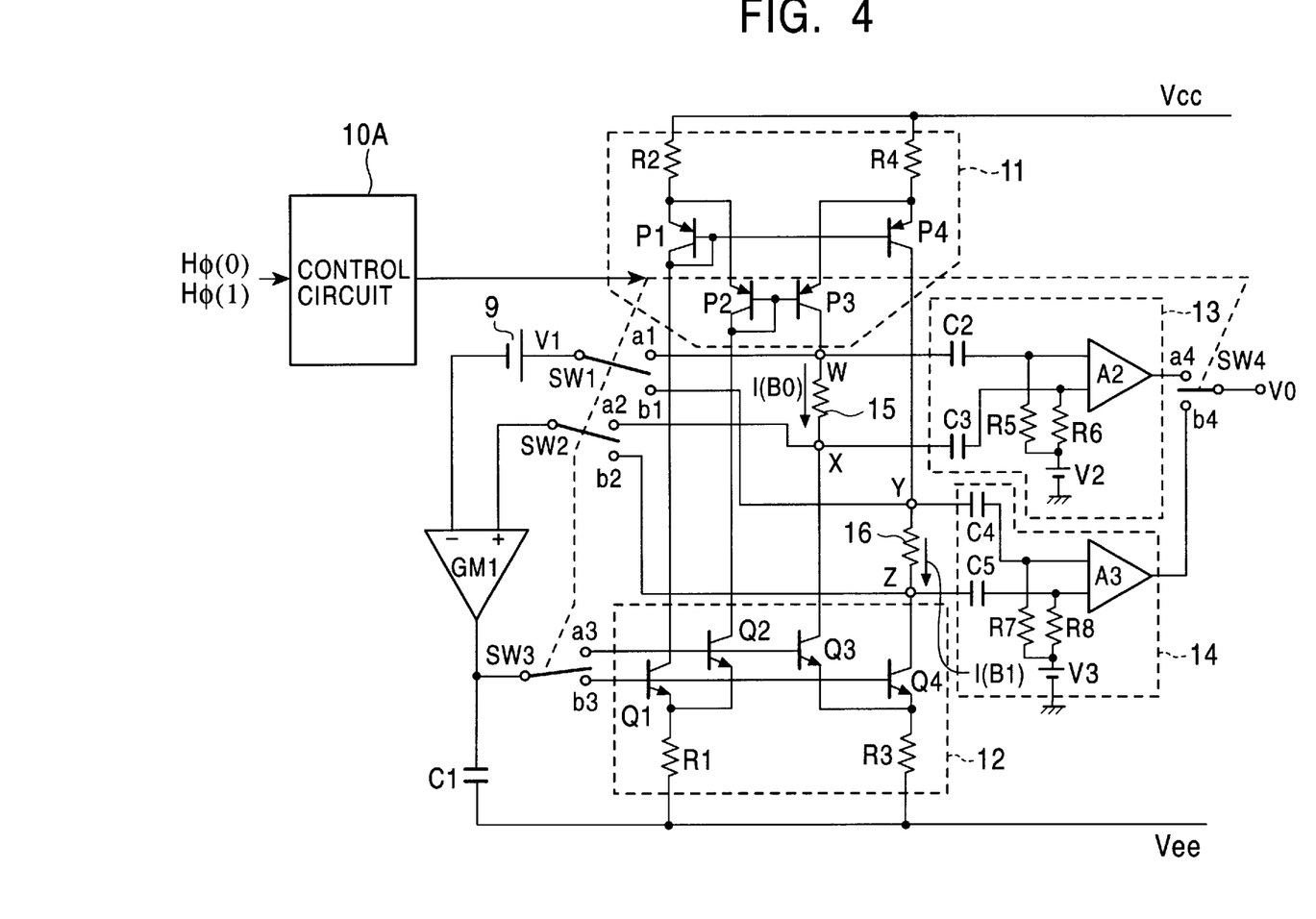
FIG. 4 shows another embodiment of a circuit diagram of a reproducing amplifier circuit employing a pair of MR heads according to the present invention.

In accordance with the embodiment in FIG. 6, another switch SW5 is connected in parallel to the capacitor C1 relative to the circuit diagram for the 2-channel head type reproducing apparatus in FIG. 4, and further a control circuit 10B is provided instead of the control circuit 10A synchronization A control signal Fc1 from the control circuit 10B controls the operation of the operational amplifier GM1, a control signal Fc2 from the control circuit 10B controls the switch SW5 and a control signal Fc3 from the control circuit 10B controls switches SW1 to SW4 in.

When a switching signal HΦ(1) for switching from the MR head 15 to the MR head 16 is supplied to the control circuit 10B, the control circuit 10B generates the first control signal Fc1 for stopping the operation of the operational amplifier GM1, and further the control circuit 10B also generates the second control signal Fc2 for making the switch SW5 ON during an interval T1 where the output voltage of the operational amplifier GM1 is adequately lowered. After that, the control circuit 10B generates the third control signal Fc3 for switching the switches SW1, SW2, SW3 and SW4 in synchronism. The other construction of the circuit diagram of this embodiment is the same as the circuit diagram in FIG. 4, so that a further description is omitted here.

Figure 7:
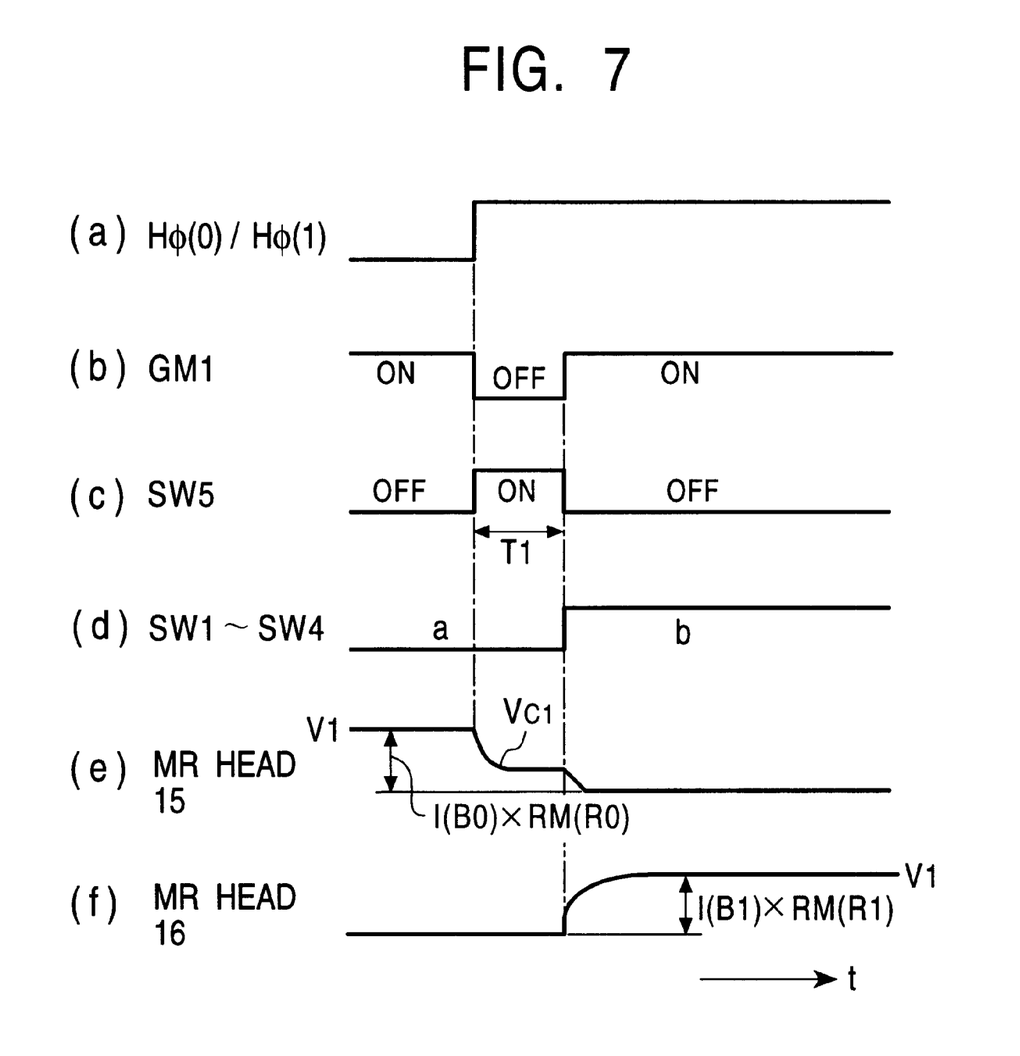

The operation of this embodiment is explained next. As shown in FIG. 7(a), when the switching signal HΦ(1) for switching from the MR head 15 to the MR head 16 is supplied to the control circuit 10B, the control circuit 10B generates the first control signal Fc1 to be supplied to the operational amplifier GM1 to halt the operation as shown in FIG. 7(b); and, further the control signal Fc2 is also supplied to the switch SW5 from the control circuit 10B.

According to the control signal Fc2, as shown in FIG. 7(c), the charge stored in the capacitor C1 corresponding to the output voltage of the operational amplifier GM1 is discharged to the lower power source Vee, so that the voltage Vc1 of the capacitor C1 is lowered during the time interval T1 when the switch SW5 is made ON. During this time interval T1, a bias current corresponding to the voltage Vc1 is kept flowing through the MR head 15, so that the current flowing through the MR head 15 is gradually reduced, as shown in FIG. 7(e), and thereby the terminal voltage of the MR head 15 is gradually lowered.

After the time interval T1, the third control signal Fc3 is then supplied simultaneously to switches SW1, SW2, SW3 and SW4 from the control circuit 10B, so that, synchronism the switch SW3 is changed to the terminal b1, the switch SW2 is changed to the terminal b2, the switch SW3 is changed to the terminal b3 and the switch SW4 is changed to the terminal b4 in.

By this switching operation, the voltage V1 of the reference voltage supply 9 is applied to the MR head 16, and the bias current of the MR head 15 abruptly starts to flow through the MR head 16 instantaneously. But in this embodiment, the rush current is small because the voltage Vc1 applied to the MR head 16 at the switch timing is adequately lowered as shown in FIG. 7(e), so that the excess voltage is not applied to the MR head 16 when switched to the MR head 16. When the resistance RM(R1) of the MR head 16 is changed by the magnetic field from the magnetic recording medium, the output voltage V0=I(B1)×RM(R1) is obtained through the output circuit 14 as reproduced signal of the recorded information of the magnetic recording medium.

The other operations of this embodiment are the same as the operations of the 2-channel, head-type reproducing apparatus in FIG. 4, so that further explanation of the operations is omitted here.

As described above, according to this embodiment of the present invention, when the MR head 15 is changed to the MR head 16, the operation of the operational amplifier GM1 is halted during a predetermined time interval T1 in accordance with the control signal Fc1 by making the switch SW5 ON. Further, after the voltage of the capacitor C1 corresponding to the output voltage of the operational amplifier GM1 is adequately lowered, the switch SW1 is changed to the terminal b1, the switch SW2 is changed to the terminal b2, the switch SW3 is changed to the terminal b3 and the switch SW4 is change to the terminal b4 simultaneously by the control signal Fc3 from the control circuit 10B.

By this switching operation, the reference voltage V1 of the reference power supply 9 is applied to the MR head 16, and the bias current of the MR head 15 starts to flow through the MR head 16 instantaneously. But in this embodiment, the current flowing through the MR head 16 becomes small, because the voltage Vc1 applied to the MR head 16 is adequately lowered, so that the excess voltage is not applied to the MR head 16 when the switching in accordance with this embodiment.

Accordingly excess voltage of more than a predetermined value is not applied to the MR head, so that deterioration of the quality of the MR head, which has a high manufacturing cost is completely avoided, in spite of the dispersion of the resistance of the MR head, and thereby the operation life of the reproducing apparatus employing the MR head is extended.

In the above-mentioned embodiment, the HDD apparatus using a pair of MR heads is explained, but the scope of this invention is not limited to this embodiment. Namely, this invention is applicable to a reproducing apparatus employing a plurality of MR heads

What is claimed is:

1. A magnetic reproducing apparatus comprising:
   a magnetic recording medium;
   a head for reproducing a information signal received from said magnetic recording medium;
   a first current source connected to a first terminal of said head;
   a second current source connected to a second terminal of said head; and
   an amplifier having input terminals connected to said first and second terminals of the head wherein
      current of said first current source is controlled by said amplifier, and
      wherein said input terminals of the amplifier includes an inverting input terminal and a non-inverting input terminal, and
      a reference voltage source is connected between said non-inverting input terminal of the amplifier and said first terminal.

2. The magnetic reproducing apparatus as claimed in claim 1, wherein
   said amplifier controls said current of the first current source to keep the voltage between said first and second terminals of the head at a predetermined voltage.

3. The magnetic reproducing apparatus as claimed in claim 2, wherein
   said amplifier has a predetermined cutoff frequency,
   said amplifier makes said voltage drop between said first and second terminals of the head a fixed value relative to a frequency band that is lower than said predetermined cutoff frequency,
   said amplifier supplies approximately the same current from said first and second current sources to said first and second terminals of the head relative to a frequency band that is higher than said cutoff frequency, and
   said amplifier derives a signal voltage from changes in a resistance of said head.

4. The magnetic reproducing apparatus as claimed in claim 3, further comprising:
   a resistive element connected between said first and second terminals of the head, wherein
      resistance of said resistive element is set higher than a resistance of said head.

5. The magnetic reproducing apparatus as claimed in claim 2, further comprising:

a resistive element connected between said first and second terminals of the head, wherein
resistance of said resistive element is set higher than a resistance of said head.

6. The magnetic reproducing apparatus as claimed in claim 2, wherein
said input terminals of the amplifier includes an inverting input terminal and a non-inverting input terminal, and
a reference voltage source is connected between said non-inverting input terminal of the amplifier and said first terminal.

7. The magnetic reproducing apparatus as claimed in claim 1, further comprising:
a resistive element connected between said first and second terminals of the head, wherein
resistance of said resistive element is set higher than a resistance of said head.

8. The magnetic reproducing apparatus as claimed in claim 1, further comprising:
a second amplifier connected to said first and second terminals of the magnetic head for amplifying output signal from said head.

9. The magnetic reproducing apparatus as claimed in claim 1, wherein
said head is a magneto-resistive type head.

10. The magnetic reproducing apparatus as claimed in claim 1, further comprising:
a second head for reproducing said information signal from said magnetic recording medium;
a third current source connected to a first terminal of said second head; and
a fourth current source connected to a second terminal of said second head; wherein
current of said third current source is controlled by said amplifier connected to said second head, and
a control circuit is further provided for selecting said first head and said second head.

11. The magnetic reproducing apparatus as claimed in claim 10, further comprising:
a switch circuit interposed between said amplifier and said first and said third current sources, wherein
said switch circuit is controlled by said control circuit.

12. The magnetic reproducing apparatus as claimed in claim 11, further comprising;
a second switch circuit interposed between said amplifier and said first and second heads, wherein
said second switch circuit is controlled by said control circuit.

13. The magnetic reproducing apparatus as claimed in claim 10, further comprising;
a second switch circuit interposed between said amplifier circuit and said first and second heads, wherein
said second switch circuit is controlled by said control circuit.

14. The magnetic reproducing apparatus as claimed in claim 10, wherein
said control circuit controls the operation of said amplifier circuit.

15. The magnetic reproducing apparatus as claimed in claim 10, further comprising:
a capacitive element connected to the amplifier circuit; and
a third switch circuit connected parallel to said capacitive element, wherein
said third switch circuit is controlled by said control circuit.

16. The magnetic reproducing apparatus as claimed in claim 15, wherein
said control circuit controls the operation of said amplifier circuit.

17. The magnetic reproducing apparatus as claimed in claim 16, wherein
said control circuit issues a command signal to halt the operation of the amplifier circuit and to make the third switch ON, and thereafter
said control circuit switches the first head and the second head.

18. The magnetic reproducing apparatus as claimed in claim 10, further comprising:
a second amplifier circuit connected to said first and second terminals of the second head and also connected in parallel to said amplifier.

19. The magnetic reproducing apparatus as claimed in claim 18, further comprising:
a fourth switch circuit connected between a signal output terminal and said first and second amplifiers.

20. A reproducing circuit to be applied to a magnetic reproducing apparatus comprising:
first and second terminals to be connected to a pair of terminals of a head;
a first current source connected to said first terminal;
a second current source connected to said second terminal; and
an amplifier connected to said first and second terminals to input terminals of said amplifier, wherein
said amplifier controls the current of said first current source, and
said input terminals of the amplifier include an inverting input terminal and a non-inverting input terminal, and
a reference voltage source is connected between said non-inverting input terminal of the amplifier and said first terminal of the head.

21. The reproducing circuit as claimed in claim 20, wherein
said amplifier controls said current of the first current source to keep a voltage between said first and second terminals of the head at a predetermined voltage.

22. The reproducing circuit as claimed in claim 21, wherein
said amplifier has a predetermined cutoff frequency,
said amplifier makes said voltage between said first and second terminals of the head a fixed value relative to a frequency band that is lower than said predetermined cutoff frequency, and
said amplifier supplies approximately the same current from said first and second current sources to said first and second terminals of the head relative to a frequency band that is higher than said cutoff frequency.

23. The reproducing circuit as claimed in claim 22, further comprising:
a resistive element connected between said first and second terminals of the head, wherein
a resistance of said resistive element is set higher than a resistance of said head.

24. The reproducing circuit as claimed in claim 23, further comprising:
a resistive element connected between said first and second terminals of the head, wherein
a resistance of said resistive element is set higher than a resistor of said head.

25. The reproducing circuit, as claimed in claim 21, wherein
   said input terminals of the amplifier include an inverting input terminal and a non-inverting input terminal, and
   a reference voltage source is connected between said non-inverting input terminal of the amplifier and said first terminal of the head, wherein
      said reference voltage source supplies said predetermined voltage.

26. The reproducing circuit as claimed in claim 20, further comprising:
   a resistive element connected between said first and second terminals of the head, wherein
      resistance of said resistive element is set higher than a resistance of said head.

27. The reproducing circuit as claimed in claim 20, further comprising:
   a second amplifier connected in parallel to said first and second terminals and also connected in paralell to said amplifier.

28. The reproducing circuit as claimed in claim 20, wherein
   said second current source has a current mirror constitution.

29. The reproducing circuit as claimed in claim 20, further comprising:
   third and fourth terminals connected to a pair of terminals of a second head;
   a third current source connected to said third terminal;
   a fourth current source connected to said forth terminal; and
   a control circuit for selecting said first head and said second head, wherein
      current of said third current source is controlled by said amplifier connected to said second head.

30. The reproducing circuit as claimed in claim 29, further comprising:
   a switch circuit interposed between said amplifier and said first and said third current sources, wherein
      said switch circuit is controlled by said control circuit.

31. The reproducing circuit as claimed in claim 30, further comprising:
   a second switch circuit interposed between said amplifier circuit and said second and fourth terminals, wherein
      said second switch circuit is controlled by said control circuit.

32. The reproducing circuit as claimed in claim 29, further comprising:
   a second switch circuit interposed between said amplifier circuit and said second and fourth terminals, wherein
      said second switch circuit is controlled by said control circuit.

33. The reproducing circuit as claimed in claim 29, wherein said control circuit controls the operation of said amplifier circuit.

34. The reproducing circuit as claimed in claim 29, further comprising:
   a capacitive element connected to the amplifier circuit; and
   a third switch circuit connected in parallel to said capacitive element, wherein
      said third switch circuit is controlled by said control circuit.

35. The reproducing circuit as claimed in claim 34, wherein
   said control circuit controls the operation of said amplifier.

36. The reproducing circuit as claimed in claim 35, wherein
   said control circuit issues a command signal to halt the operation of the amplifier circuit and to make the third switch ON, and thereafter
   said control circuit switches the first head and the second head.

37. The reproducing circuit as claimed in claim 29, further comprising:
   a second amplifier circuit connected to said third and forth terminals and also connected in parallel to said amplifier.

38. The reproducing circuit as claimed in claim 37, further comprising:
   a fourth switch circuit connected between a signal output terminal and said first and second amplifiers.

* * * * *